(12) United States Patent
Putra et al.

(10) Patent No.: US 9,996,194 B1
(45) Date of Patent: Jun. 12, 2018

(54) TOUCH SCREEN SELF-CAPACITANCE FOREIGN MATTER DETECTION

(71) Applicant: STMicroelectronics Asia Pacific Pte Ltd, Singapore (SG)

(72) Inventors: Ade Putra, Singapore (SG); Kusuma Adi Ningrat, Batam (ID)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days. days.

(21) Appl. No.: 15/362,434

(22) Filed: Nov. 28, 2016

(51) Int. Cl.
*G09G 1/00* (2006.01)
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04108* (2013.01)

(58) Field of Classification Search
CPC ...... G06F 3/044; G06F 3/0414; G06F 3/0416; G06F 3/0412; G06F 3/041; G06F 3/0418
See application file for complete search history.

(56) References Cited

U.S. PATENT DOCUMENTS

2012/0044193 A1* 2/2012 Peng .................... G06F 3/044
345/174
2017/0153737 A1* 6/2017 Chawda ............... G06F 3/0414

* cited by examiner

*Primary Examiner* — Michael Faragalla
(74) *Attorney, Agent, or Firm* — Crowe & Dunlevy

(57) ABSTRACT

A method for touch screen self-capacitance foreign matter detection for a capacitive touch screen is disclosed. By iteratively performing methods of self-capacitance scanning and foreign matter scanning foreign matter may be detected.

25 Claims, 4 Drawing Sheets

TOUCH SCREEN SELF-CAPACITANCE FOREIGN MATTER DETECTION

FIELD OF THE INVENTION

The present disclosure generally relates to capacitive touchscreen panels and, more particularly, to a system and method for foreign matter detection for use in a capacitive touchscreen panel.

BACKGROUND

Touchscreen panels are typically incorporated in various electronic devices to detect a user input (i.e., user touch or hover) and to display content. The touchscreen panels include an active portion capable of detecting the user input and displaying content. This active portion is typically formed from a display panel on top of which a capacitive sensing panel is provided which includes multiple layers of capacitive sensing circuitry arranged in a pattern.

A capacitive sensing panel is provided in a touchscreen panel for an electronic device such as a smart phone, GPS device, tablet computer, mobile media player, remote control device, or any other device capable of using a touchscreen panel. The sensing panel includes a patterned array of conductive features arranged in a configuration. For instance, the patterned array of conductive features may include sets of lines, conductive pads, overlapping structures, interleaved structures, diamond structures, lattice structures, and the like. The conductive features may form capacitive nodes at various points. The capacitive sensing panel evaluates changes in capacitance at each capacitive node to detect a user touch or hover, such as by a finger or other body part as well as by a tool such as a stylus.

SUMMARY

A self-capacitance foreign matter detection method is disclosed. The method includes performing a self-capacitance scan including sequentially exciting pluralities of columns of nodes of a node array and measuring a change in self-capacitance of at least one node to generate touch detection data. The method further includes performing a foreign matter scan including sequentially exciting a single column of nodes of the node array and measuring a further change in self-capacitance of at least one node of the single column of nodes to generate a foreign matter detection data. Finally, the method includes categorizing a node state including assigning a node state to each node in response to the touch detection data and the foreign matter detection data in order to detect a presence of foreign matter.

A foreign matter scan is disclosed. The foreign matter scan may include addressing a first column of nodes, exciting, at a first time, only the first column of nodes, grounding, at the first time, every column of nodes adjacent to the first column of nodes, and monitoring, in a self-capacitance mode, a change in self-capacitance on at least one node of the first column of nodes only in order to detect a presence of foreign matter.

A self-capacitance foreign matter detection method is disclosed. The method may include exciting, by a node excitation engine, a first node of a node array corresponding to an index, with an excitation pulse, simultaneously with the exciting, further exciting by the node excitation engine, a second node adjacent to the first node, and monitoring, by a touch detection engine, a change in self-capacitance on the first node. The method may include incrementing the index to address the second node, exciting, by the node excitation engine, the second node corresponding to the index, with the excitation pulse, simultaneously with the exciting, further exciting by the node excitation engine, a third node adjacent to the second node, and monitoring, by the touch detection engine, a change in self-capacitance on the second node. The method may include incrementing the index to address the third node, exciting, by the node excitation engine, the third node corresponding to the index with the excitation pulse, simultaneously with the exciting, further exciting by the node excitation engine, the first node and the second node, and monitoring, by the touch detection engine, a change in self-capacitance on the third node. The method may further include determining, by a scan controller, that each node of the node array has been excited, storing, by a data storage and retrieval engine, touch detection data corresponding to the change in self-capacitance on the first node, the change in self-capacitance on the second node, and the change in self-capacitance on the third node, and resetting the index to correspond to the first node of the node array. The method may continue, including exciting, by the node excitation engine, the first node of the node array corresponding to the index, with the excitation pulse, simultaneously with the exciting, isolating, by the node excitation engine, the second node adjacent to the first node, monitoring, by the touch detection engine, a further change in self-capacitance on the first node, and incrementing the index to address the second node. The method may include exciting, by the node excitation engine, the second node corresponding to the index, with the excitation pulse, simultaneously with the exciting, isolating, by the node excitation engine, the third node adjacent to the second node, monitoring, by the touch detection engine, a further change in self-capacitance on the second node, and incrementing the index to address the third node. The method may include exciting, by the node excitation engine, the third node corresponding to the index with the excitation pulse, simultaneously with the exciting, isolating by the node excitation engine the first node and the second node, and monitoring, by the touch detection engine, a further change in self-capacitance on the third node. The method may also include determining, by the scan controller, that each node of the node array has been excited, and storing, by the data storage and retrieval engine, foreign matter detection data corresponding to the further change in self-capacitance on the first node, the further change in self-capacitance on the second node, and the further change in self-capacitance on the third node.

BRIEF DESCRIPTION OF DRAWINGS

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

Embodiments are illustrated by way of example in the accompanying figures not necessarily drawn to scale, in which like numbers indicate similar parts, and in which.

DETAILED DESCRIPTION OF THE DRAWINGS

Figure 1A:
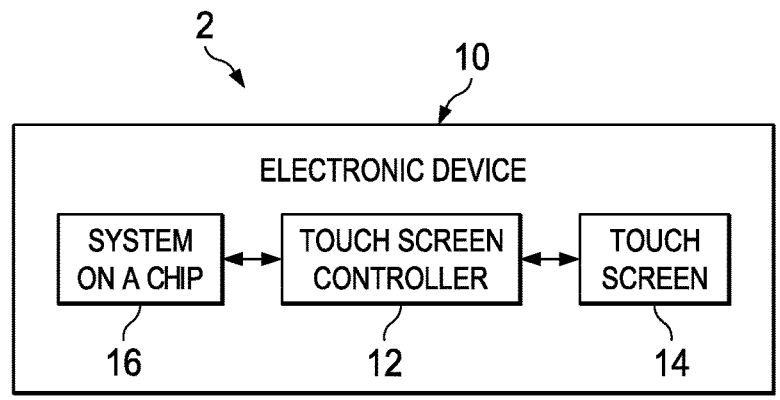
FIG. 1A illustrates an electronic device having a capacitive touch screen configured to receive user input.

With reference to FIG. 1A, an electronic device 2 comprises any device configured to receive user input. For example, an electronic device 2 may comprise a smart phone, a GPS device, a tablet computer, a mobile media player, a remote control device, or any other device as desired. The electronic device 2 further comprises a touch sensitive interface system 10. A touch sensitive interface system 10 is configured to accept user input via touching such as from the user's body and/or a tool such as a stylus. The touch sensitive interface system 10 also provides output, such as by a human-readable display.

More specifically, the touch sensitive interface system 10 comprises a multi-touch capacitive touch screen 14, a touch screen controller 12, and a system on a chip 16. The system on a chip 16 may comprise a processor, interface, circuitry, and/or the like configured to direct the flow of input and output data to a multi-touch capacitive touch screen 14 and an associated touch screen controller 12. The touch screen controller 12 is configured to be in logical communication with the system on a chip 16. The touch screen controller 12 comprises a processor and a memory in logical communication with the multi-touch capacitive touch screen 14. The touch screen controller 12 performs various methods with respect to the multi-touch capacitive touch screen 14 as discussed further herein.

Figure 2:
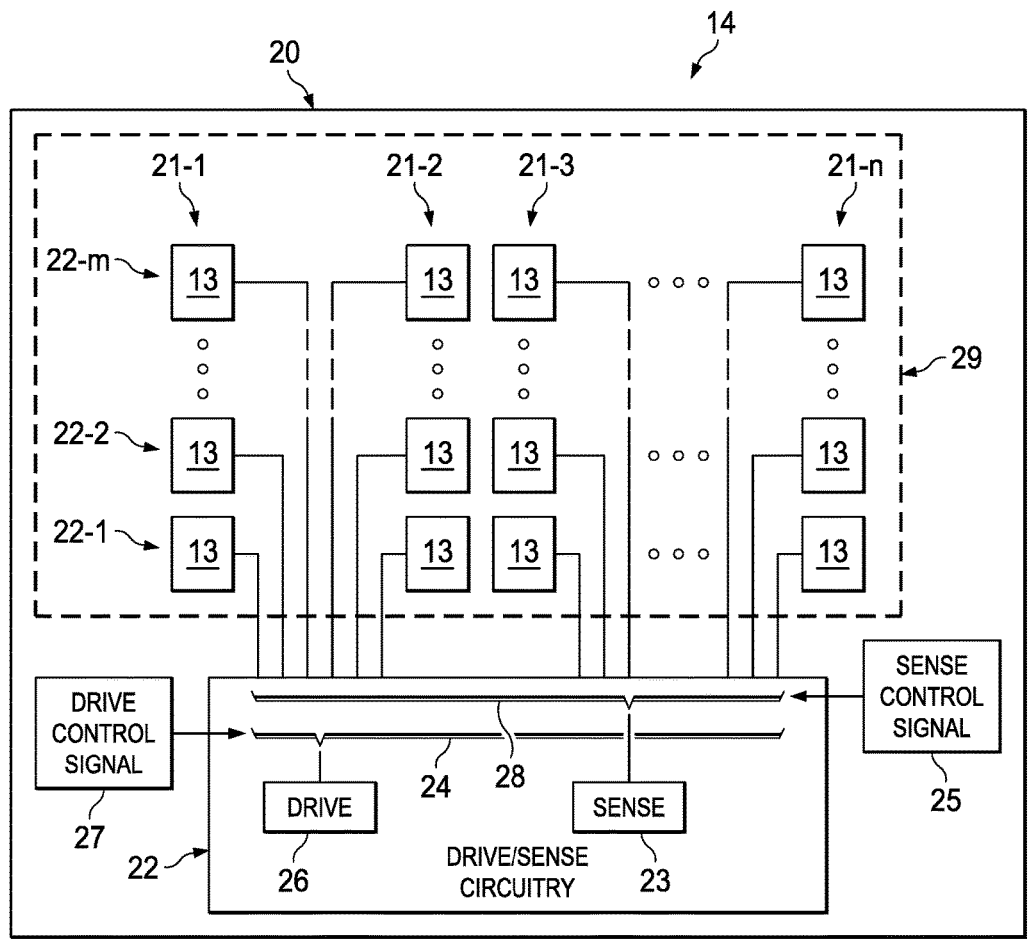
FIG. 2 illustrates a capacitive sensing panel of the capacitive touch screen.

With reference to FIG. 2, a multi-touch capacitive touch screen 14 includes a capacitive sensing panel 20. Capacitive sensing panel 20 comprises a plurality of self-capacitance nodes 13 arranged in a node array 29. The nodes 13 are operable by the touch screen controller 112 in a self-capacitance mode.

A node array 29 may include a plurality of nodes 13 which may form a first column 21-1, a second column 21-2, and any number of columns such as Nth column 21-n. Similarly, a node array 29 may include a plurality of nodes 13 which may form a first row 22-1, a second row 22-2, a third row 22-3 and any number of rows such as an Mth row 22-m. Each node 13 is connected to drive/sense circuitry 22.

Drive/sense circuitry 22 has a drive module 26 to drive nodes 13 with a signal in response to a drive control signal 27 which addresses which nodes 13 to drive. Drive/sense circuitry 22 has a sense module 23 to sense nodes 13 in response to a sense control signal 25 which addresses which nodes 13 to sense. In various embodiments a same node 13 can be both simultaneously driven and sensed. The drive control signal 27 directs a drive node switching network 24 to connect the nodes 13 desired to be driven to the drive module 26. The sense control signal 25 directs a sense node switching network 28 to connect the nodes 13 desired to be sensed to the sense module 23.

Each node 13 comprises a conductive feature. In various embodiments, an equal number of rows 22 and columns 21 exist, whereas in further embodiments, the number of rows 22 and columns 21 differs. Moreover, the touch screen controller 12 may purpose various nodes 13 to act in a sensing capacity and various nodes 13 to act in a drive capacity from time to time. For example, during a self-capacitance mode, one or more node 13 may perform both drive and sense functions so that self-capacitance is monitored. As used herein, self-capacitance, such as "a change in self-capacitance" means the capacitance between a single node 13 and a circuit reference such as a circuit ground, which may be affected by environmental aspects, such as another nodes(s) or proximate structure(s) such as a finger, stylus, or foreign matter. This is in distinction to "mutual capacitance" such as "a change in mutual capacitance" which means the capacitance measured between two different nodes 13.

While the node array 29 comprises nodes 13 is arranged into rows 22 and columns 21 as shown FIG. 2, the nodes 13 of the node array 29 may be arranged in any pattern as desired. One may appreciate that other shapes than perpendicular rows and columns may be implemented, for instance, such as being interleaved, or at various angles, or otherwise, as desired.

Induced voltage and/or current perturbations may arise on a node 13 as a result of the presence of a finger, stylus, or unwanted foreign matter such as water, parasitically sinking current from the a node 13 to a ground. In a self-capacitance mode, the touch screen controller 12 configures a node 13 to sense the capacitance between any given node 13 and a surrounding panel reference (for example, ground). By sensing a change in self-capacitance for the given node 13, the drive/sense circuitry 22 detects a user touch or hover at or near that node 13.

In a self-capacitance mode, the touch screen controller 12 directs the drive module 26 of the drive/sense circuitry 22 to excite a plurality of nodes 13, such as a first column 21-1, in whole or part, with a waveform. The touch screen controller 12 monitors the amount of charge (or current) needed to substantially fully charge a capacitance disposed between one or more associated nodes 13 of the first column 21-1 and a circuit ground. The stored charge may discharge via a current directly coupled from the node 13 to a finger, stylus or other touch (and to a lesser degree, via fringe field coupling to adjacent nodes 13). A water droplet increases the fringe field strength, enhancing the capacitive coupling between the node 13 and adjacent nodes 13, such as of an adjacent column, for instance, second column 21-2. Moreover, the effect of a water droplet is selectably diminished by driving the nodes 13 of adjacent columns with a similar or identical waveform, substantially zeroing any potential difference between the node 13 and adjacent nodes 13 of the adjacent columns, and thus substantially zeroing any potential current flow via a fringe field between nodes 13. By alternately driving adjacent columns of nodes and not driving adjacent columns of nodes, as discussed later herein, various advantageous detection scenarios may be implemented whereby the presence of water and the presence of wanted touches are distinguished without need for use of a mutual-capacitance mode.

Figure 1B:
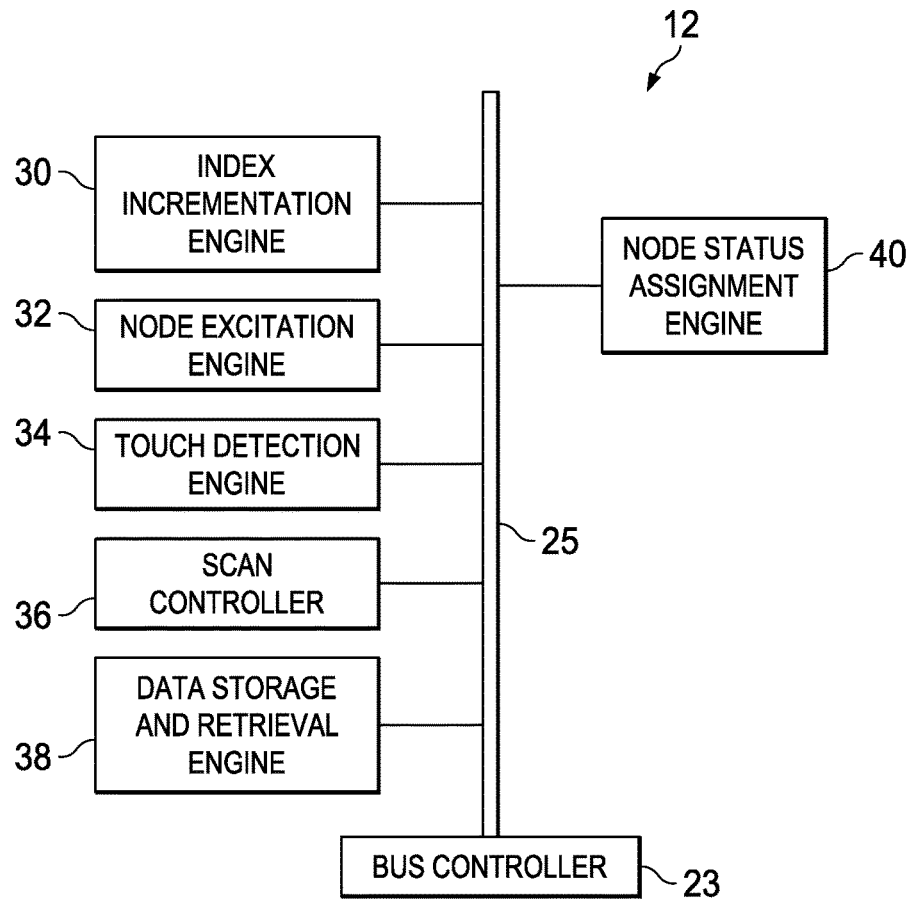
FIG. 1B illustrates a logical structure of a touch screen controller.
Figure 3:
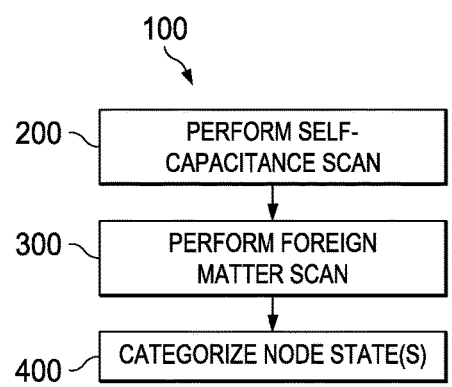
FIG. 3 illustrates a method for foreign matter detection for the capacitive touch screen.
Figure 4:
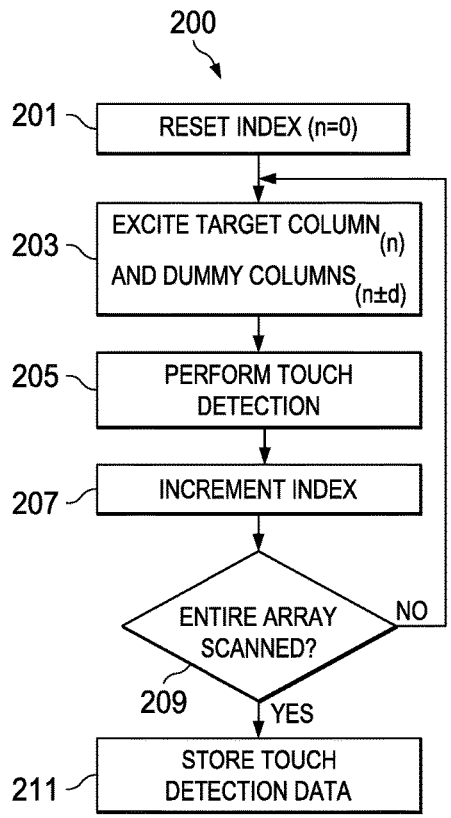
FIG. 4 illustrates a method of self-capacitance scanning for a method of foreign matter detection according to FIG. 3.
Figure 5:
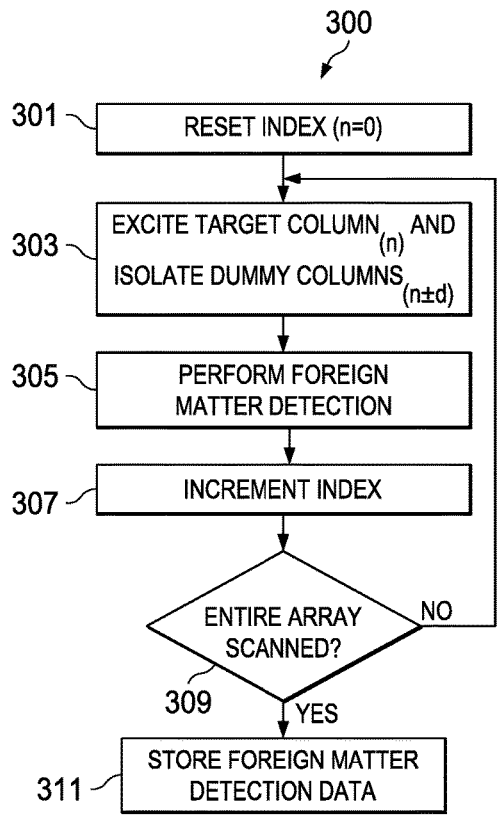
FIG. 5 illustrates a method of foreign matter scanning for a method of foreign matter detection according to FIG. 3.
Figure 6:
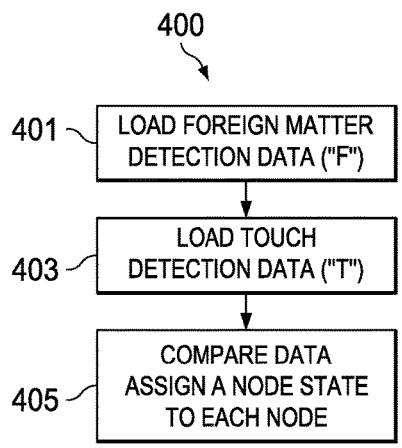
FIG. 6 illustrates a method of node state categorization for a method of foreign matter detection according to FIG. 3.

With reference to FIG. 1B, FIG. 2, and FIG. 3, the touch screen controller 12 comprises various logical modules, which, in connection with the electronic device 2 of FIG. 1B and the multi-touch capacitive touch screen 14 of FIGS. 1A and 2, interoperate to execute various computer implemented methods, such as a self-capacitance foreign matter detection method 100 (FIG. 3). Various logical modules of the touch screen controller 12 communicate with the drive module 26 and the sense module 23 to control the driving (excitation) and sensing process.

The touch screen controller 12 comprises a bus 25 and a bus controller 23. The bus 25 may comprise a physical bus, or may comprise a logical bus resident in the touch screen controller 12. Moreover, the bus controller 23 may comprise a logical unit of the touch screen controller 12 configured to direct communication between and among the different engines and modules connected to the bus 25 and similarly among the drive module 26 and the sense module 23 as well as providing the drive control signal 27 and sense control signal 25.

The touch screen controller 12 comprises an index incrementation engine 30. An index incrementation engine 30 comprises an aspect of a processor and/or electronic storage memory configured to maintain an integer index to identify a subset of nodes 13. For instance, at certain instances in time, each node 13 of a column 21 or row 22 may be driven singly and/or in a sequential pattern. The index incrementation engine 30 increments an index identifying which node 13 is desired to be driven at a particular time.

The touch screen controller 12 also comprises a node excitation engine 32. A node excitation engine 32 communicates with the index incrementation engine 30 via the bus 25 under instruction of the bus controller 23 and generates an electronic waveform whereby one or more node 13 is excited. For instance, the node 13 indicated by the index incrementation engine 30 is excited with an electronic waveform by the node excitation engine 32 at a particular time.

The touch screen controller 12 also comprises a node status assignment engine 40. A node status assignment engine 40 communicates with the data storage and retrieval engine 38 to obtain data that is developed and collected by various engines, and methods, and use this data to assign a node status to each node 13. For example, a node status comprises an indication as to whether the node 13 is under the influence of a wanted touch, a foreign matter such as a water droplet, both, or neither.

The touch screen controller 12 comprises a touch detection engine 34. The touch detection engine 34 monitors one or more node 13 and may measure an instantaneous electrical voltage and/or current and/or a changing electrical voltage and/or current. In this manner, the coupling of the electronic waveform from the node that is excited by the node excitation engine 32 to other nodes of other columns of nodes and/or to a finger, stylus, or other article touching the touch screen, and/or foreign matter present on the touch screen is detected and classified as a wanted touch and/or as an instance of foreign matter.

The touch screen controller 12 comprises a scan controller 36. A scan controller 36 interoperates with the index incrementation engine 30, the node excitation engine 32, and the touch detection engine 34 via the bus 25. The scan controller 36 determines when the entirety of a desired set of nodes 13 has been scanned (e.g., excited and monitored) by the touch detection engine 34.

The touch screen controller 12 comprises a data storage and retrieval engine 38. A data storage and retrieval engine 38 stores data generated by at least one of the index incrementation engine 30, the node excitation engine 32, the touch detection engine 34, the scan controller 36, and/or the bus controller 23 for retrieval and later use. Moreover, the data storage and retrieval engine 38 may retrieve previously stored data, or data from other systems and components, and provide the data to at least one of the index incrementation engine 30, the node excitation engine 32, the touch detection engine 34, the scan controller 36, and/or the bus controller 23.

Having discussed various structural aspects of a touch screen controller 12, attention is directed to FIG. 3, with continued attention on FIGS. 1A, 1B, and 2, wherein a self-capacitance foreign matter detection method 100 that is implemented by a touch screen controller 12 is disclosed.

A self-capacitance foreign matter detection method 100 operates to distinguish between wanted touches and foreign matter. For instance, in certain scenarios, when one node 13 of a column 21 is sensing (e.g., driven to some charge level and monitored for capacitive coupling), one or more adjacent node 13 of one or more adjacent column 21 is also driven with a same or similar exciting waveform. For instance, when a node 13 of column 21-2 and row 22-2 is sensing, one or more of nodes 13 of column 21-1 (such as lie in row 22-1, 22-2, 22-$m$) or one or more nodes of column 21-3 (such as lie in row 22-1, 22-2, 22-$m$), or even one or more nodes 13 of column 21-1 that are not sensing may be driven with a same or similar exciting waveform. In various embodiments, all the nodes of immediately adjacent columns are driven when any or all nodes of a given column is sensing. In this manner, capacitive interaction between the driven node(s) 13 ("sensing" node) and the adjacent node(s) 13 ("dummy" node(s)) may be minimized. Since the driven node(s) 13 and the adjacent node(s) 13 are all excited, there will be little or no potential difference between the nodes 13. Consequently, while the presence of a wanted touch, such as a stylus or finger approaching the driven node will cause a change in the capacitance of the node, the presence of foreign matter, such as a water droplet overlapping both the driven node and the adjacent node, will not be detected.

Thus, there is a beneficial effect that the foreign matter does not trigger a false touch detection. However, there is a challenge arising in that it is not possible to identify the presence or absence of foreign matter on the screen, and thus, it is not possible to use such identification to change operating parameters or modes in response to the foreign matter presence.

As discussed herein, the foreign matter detection method 100 introduces a further mechanism whereby the presence of foreign matter is identified. Subsequent to, or prior to, the driving of the driven node(s) and the dummy node(s), in various embodiments, each node 13, or in some embodiments each column 21 of nodes 13 is excited individually (or as a columnar group) and sequentially while each adjacent node 13 or columnar group of nodes 13 is not driven. As a consequence, there is a capacitive interaction between the driven node(s) 13 and the adjacent node(s) 13 arising from a potential difference between the nodes. By virtue of this potential difference, an electrical field is instantiated between the drive node(s) 13 and one or more adjacent node(s) 13. Foreign matter residing on the touch screen will alter the dielectric constant of the space between the driven node(s) 13 and the one or more adjacent node(s) 13, causing variations in the capacitive coupling among the nodes 13. By measuring such variations, the presence as well as the location of foreign matter residing on the touch screen is identified.

Consequently, a self-capacitance foreign matter detection method 100 includes at least two different scanning methods performed in sequence. For instance, a self-capacitance foreign matter detection method 100 includes performing a self-capacitance scan 200 comprising sequentially exciting pluralities of columnar arrangements 21 of nodes 13 and measuring the capacitance of at least one of each excited plurality of nodes 13 and storing touch detection data. The method 100 includes performing a foreign matter scan 300 comprising sequentially exciting a single columnar arrangement 21 of nodes 13 and measuring the capacitance of at least one of the node(s) 13 of the single columnar arrangement 21 of node(s) 13 and storing foreign matter detection data. Subsequently, the method 100 includes categorizing a node state 400 comprising assigning a node state to each node 13 in response to the touch detection data and the foreign matter detection data.

The self-capacitance scan 200 has its own steps. For example, the scan controller 36 directs the index incrementation engine 30 to address a selected column 21 of nodes 13, the node excitation engine 32 excites that column 21 of nodes 13 and one or more adjacent column 21 of nodes 13, and the touch detection engine 34 monitors for a change in self-capacitance on each node 13 of the excited column 21. The index incrementation engine 30 sequentially addresses one or more subsequent columnar arrangement 21 of nodes 13 until the scan controller 36 indicates that a set of selected nodes 13 have all been sequentially excited (e.g., all desired nodes 13 have been scanned).

The foreign matter scan 300 has its own steps. For example, the scan controller 36 directs the index incrementation engine 30 to address a selected column 21 of nodes 13, the node excitation engine 32 excites that column 21 of nodes 13, and no other nodes 13, and the touch detection engine 34 monitors for a change in self-capacitance on the nodes 13 of that column 21. In other words, the scan controller 36 directs the index incrementation engine 30 to address a selected column 21 of nodes 13, the node excitation engine 32 excites one or more node(s) 13 of that column 21, and may at least one of ground or energize by a DC voltage each node 13 of one or more adjacent columns 21. In various embodiments, every adjacent node 13 of every adjacent column 21 is at least one of grounded or energized by a DC voltage. In this context, "adjacent" means every immediately proximate column 21 of nodes 13 to the selected column 21, which is to say, each column 21 of nodes 13 that is not separated from the excited column 21 by any interstitial nodes 13. The index incrementation engine 30 sequentially addresses one or more subsequent column of nodes until the scan controller 36 indicates that all desired nodes have been scanned.

Figure 8:
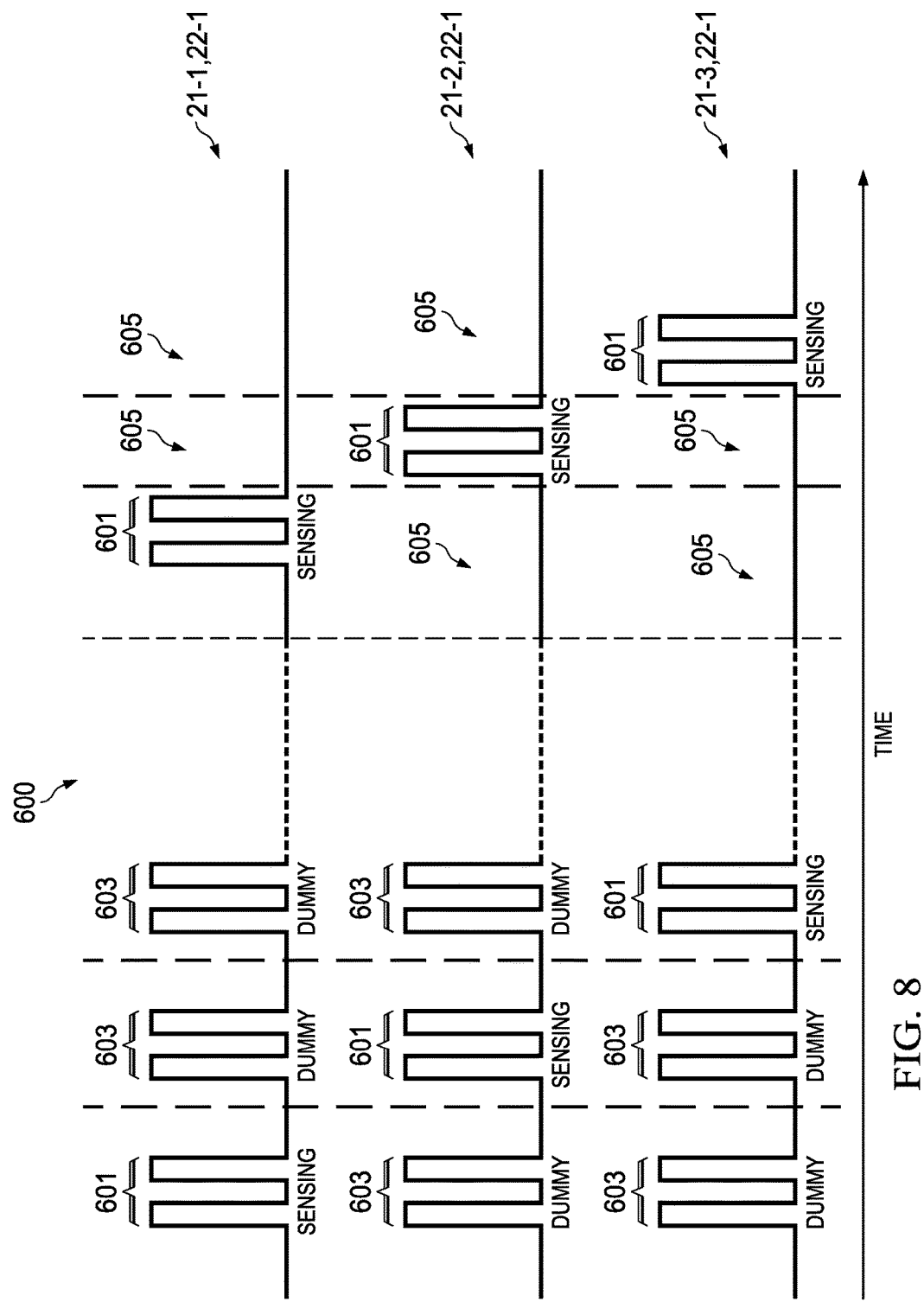
FIG. 8 depicts various signals energizing various aspects of a capacitive sensing panel according to FIG. 2.

With additional reference to FIG. 8, an excitation scenario 600 corresponding to the timed excitation of different nodes 13 during steps 200 and 300 of the foreign matter detection method 100 is depicted in greater detail. The excitation scenario 600 shows excitation pulses 601 induced on sensing nodes (e.g., the node selected at a particular time) and dummy pulses 603, induced on dummy nodes (e.g., the adjacent nodes) in step 200. For expediency, the pattern is depicted with respect to columns 21-1, 21-2, and 21-3 and only single row 22-1, although one may appreciate that a parallel scenario may be simultaneous on the other rows forming the columns.

As illustrated, at a first time, the first column 21-1 of nodes 13 is excited with excitation pulses 601, and both the second column 21-2 of nodes 13 and column 21-3 of nodes 13 are excited with dummy pulses 603. At a second time subsequent to the first time, the column 21-2 of nodes 13 is excited with excitation pulses 601, and both the first column 21-1 of nodes 13 and third column 21-3 of nodes 13 are excited with dummy pulses 603. At a third time subsequent to the second time, the third column 21-3 of nodes 13 is excited with excitation pulses 601, and both the first column 21-1 of nodes 13 and second column 21-2 of nodes 13 are excited with dummy pulses 603. This process iterates until a desired portion of the node array 29 is driven.

Subsequently, step 300 commences and at a fourth time, the first column 21-1 of nodes 13 is excited with excitation pulses 601, and both the second column 21-2 of nodes 13 and third column 21-3 of nodes 13 are isolated 605, meaning that they are at least one of grounded, clamped to a particular DC voltage, or allowed to float in a high impedance state—in this case, being grounded. At a fifth time subsequent to the fourth time, the second column 21-2 of nodes 13 is excited with excitation pulses 601, and both the first column 21-1 of nodes 13 and third column 21-3 of nodes 13 are isolated 605. At a sixth time subsequent to the fifth time, the third column 21-3 of nodes 13 is excited with excitation pulses 601, and both the first column 21-1 of nodes 13 and second column 21-2 of nodes 13 are isolated 605. This process iterates until a desired portion of the node array 29 is driven, typically the same portion as in step 200.

Figure 7:
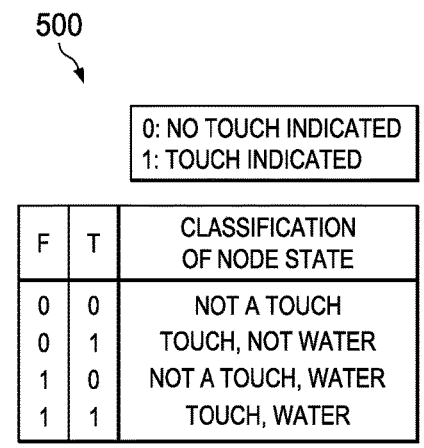
FIG. 7 illustrates a table of potential node states.

The foreign matter detection method 100 also comprises a node state categorization method 400. For instance, having completed a self-capacitance scan 200, the touch screen controller 12, via the data storage and retrieval engine 38 has now identified nodes 13 that may be undergoing a wanted touch, such as by a finger or stylus. Moreover, having completed a foreign matter scan 300, the touch screen controller 12, via the data storage and retrieval engine 38 has now identified nodes 13 that may be undergoing the influence of foreign matter, such as a water droplet on the touch screen. This data is processed against a truth table, such as depicted in FIG. 7 and discussed further below to ascertain for each node 13 whether or not that node 13 is under the influence of a foreign matter, such as water. The processing may further ascertain whether or not that node is under the influence of a wanted touch.

Having discussed generally a self-capacitance foreign matter detection method 100, attention is now directed to FIGS. 1A, 1B, 2, and 4, for a more detailed discussion of various aspects of a self-capacitance scan 200. A self-capacitance scan 200 comprises a series of steps. Specifically, a self-capacitance scan 200 comprises resetting, by an index incrementation engine 30, an index, such as is denoted by a variable n, to a first starting address. For instance, the first starting address may comprise the address of a first column of nodes, such as the lowest column (first column 21-1) of nodes 13 (Step 201). The method includes exciting a target node 13 or target column 21 of nodes 13 and dummy nodes 13 or a dummy column 21 of dummy nodes 13 (step 203). More specifically, the method includes exciting, by a node excitation engine 32, the nodes of the column that is denoted by the index. Exciting includes inducing a voltage or current, such as a time-variant voltage or current (an "excitation pulse"). For instance, for a self-capacitance scan of a node array 29, the nodes of the first column 21-1 are excited. In simultaneity, one or more adjacent column of nodes of the node array is excited as well. Such an adjacent node of an adjacent column of nodes is called a "dummy" node. In one example, the first column 21-1 is the target column of target nodes, and a second column 21-2 is a dummy column of dummy nodes.

As the index increments, the identity of the dummy columns of dummy node(s) and target column of target node may change. Moreover, the number of dummy columns may change. For instance, when the second column 21-2 of nodes 13 is the target column, then both the first column 21-1 of nodes 13 and the third column 21-3 of nodes 13 are excited as dummy columns of dummy nodes.

The method includes performing touch detection (step 205). For example, the capacitive coupling of a target node may be compared to a baseline value and determined whether or not to be indicative of the presence of a wanted touch, such as from a finger or stylus.

The method includes incrementing the index (step 207). Specifically, a self-capacitance scan 200 comprises increasing the value, by an index incrementation engine 30, of an index, such as is denoted by a variable n, to an address associated with a node and/or column of nodes other than the first starting address. For instance, the first starting address may comprise the address of the lowest column (first column 21-1) of nodes 13 and the incrementation changes the index to a second address which comprises the address of the next column (second column 21-2) of nodes 13 of the node array 29.

Subsequently the scan controller 36 determines whether or not the entire array, such as the entire node array 29 has been scanned (e.g., excited and monitored for changes in capacitance) (Step 209). If not, the method returns to step 203 and iterates. If so, the method proceeds to step 211 wherein touch detection data comprising the aggregation of the data obtained in each instance of step 205 is stored by the data storage and retrieval engine 38 (step 211).

Shifting reference to FIGS. 1A, 1B, 2, 3, and 5, a more detailed discussion of various aspects of a foreign matter scan 300 is presented. A foreign matter scan 300 comprises a series of steps. Specifically, a foreign matter scan 300 comprises resetting, by an index incrementation engine 30, an index, such as is denoted by a variable n, to a first starting address. For instance, the first starting address may comprise the address of the lowest column of nodes of a node array (Step 301). For example, for a self-capacitance scan of a node array 29, the first starting address may be an address of the first column 21-1 of nodes 13.

The method includes exciting a target column of target nodes and isolating a dummy column of dummy nodes (step 303). More specifically, the method includes exciting, by a node excitation engine 32, the column of nodes of the node array that is denoted by the index. For instance, for a self-capacitance scan of a node array 29, the nodes 13 of the first column 21-1 are excited. In simultaneity, one or more adjacent column of nodes of the node array is isolated. As used herein, isolated or isolating means at least one of grounded or clamped to a DC voltage. In various instances, isolated or isolating may mean being allowed to float to a high-impedance state. Such an adjacent column and adjacent node are called a "dummy column" and "dummy node," respectively. In one example, the first column 21-1 is the target column, and a second column 21-2 is a dummy column.

As the index increments, the identity of the dummy column(s) of dummy nodes and target column of target nodes may change. Moreover, the number of dummy columns may change. For instance, when the second column 21-2 is the target column, then both the first column 21-1 and the second column 21-2 are isolated as dummy columns.

The method includes performing foreign matter detection (step 305). For example, the capacitive coupling of the target node(s) of a target column to the dummy node(s) of a dummy column may be compared to a baseline value and determined whether or not to be indicative of the presence of a foreign matter that alters the dielectric constant of the space between the target node(s) and the dummy node(s), such as may be induced by water droplets.

The method includes incrementing the index (step 307). Specifically, a foreign matter scan 300 comprises increasing the value, by an index incrementation engine 30, of an index, such as is denoted by a variable n, to an address associated with a column of nodes other than the first starting address. For instance, the first starting address may comprise the address of the lowest column of nodes of a node array and the incrementation changes the index to a second address which comprises the address of the next column of nodes of a node array. For example, for a foreign matter scan of a node array 29, the index is incremented to reference an address of the second column 21-2 of nodes 13.

Subsequently the scan controller 36 determines whether or not the entire array, such as the entire node array 29 has been scanned (e.g., excited and monitored for changes in capacitance) (Step 309). If not, the method returns to step 303 and iterates. If so, the method proceeds to step 311 wherein foreign matter detection data comprising the aggregation of the data obtained in each instance of step 305 is stored by the data storage and retrieval engine 38 (step 311).

Shifting reference to FIGS. 1A, 1B, 2, 3, 6, and 7, a more detailed discussion of various aspects of a node state categorization method 400 is presented. Following the completion of the self-capacitance scan 200 and foreign matter scan 300, the foreign matter detection data and the touch detection data are retrieved by the data storage and retrieval engine 38 for processing by the node status assignment engine 40. The node status assignment engine 40 retrieves the foreign matter detection data ("F") (step 401). The node status assignment engine 40 retrieves the touch detection data ("T") (step 403). The node status assignment engine 40 compares the data and assigns a node status to each node 13 based on the node status truth table 500. For example, if the foreign matter detection data indicates that no foreign matter was detected proximate to the node 13, and if the touch detection data indicate that no touch was detected proximate to the node 13, then the node state is classified as "No touch; No foreign matter" for that node 13.

Other possible states are shown in FIG. 7. For example, if the foreign matter detection data indicates that no foreign matter was detected proximate to the node 13, and if the touch detection data indicate that a touch was detected proximate to the node 13, then the node state is classified as "Touch; No foreign matter" for that node 13. Similarly, if the foreign matter detection data indicates that foreign matter was detected proximate to the node 13, and if the touch detection data indicate that no touch was detected proximate to the node 13, then the node state is classified as "No touch; Foreign matter" for that node 13. Finally, if the foreign matter detection data indicates that foreign matter was detected proximate to the node 13, and if the touch detection data indicate that a touch was detected proximate to the node 13, then the node state is classified as "Touch; Foreign matter" for that node 13.

The foregoing description has provided by way of exemplary and non-limiting examples a full and informative description of one or more exemplary embodiments of this invention. However, various modifications and adaptations may become apparent to those skilled in the relevant arts in view of this description when read in conjunction with the drawings and the claims. However, all such and similar modifications of the teachings of this invention will still fall within the scope of this invention as defined in the appended claims.

What is claimed is:

1. A foreign matter detection method, comprising:
    performing a touch scan comprising exciting, at a first time, a first column of nodes of a node array with a plurality of excitation pulses and simultaneously exciting a second column of nodes and a third column of nodes of the node array with a plurality of dummy pulses and measuring a change in self-capacitance of at least one node of the first column of nodes to generate touch detection data;

performing a foreign matter scan comprising exciting, at a second time, the first column of nodes of the node array with the plurality of excitation pulses and simultaneously grounding the second column of nodes of the node array and the third column of nodes of the node array and measuring a further change in self-capacitance of at least one node of the first column of nodes to generate a foreign matter detection data; and categorizing a node state comprising assigning a state to each node in response to the touch detection data and the foreign matter detection data in order to detect a presence of foreign matter.

2. The foreign matter detection method according to claim 1, wherein the touch scan further comprises sequentially addressing a subsequent selected column of nodes.

3. The foreign matter detection method according to claim 2, wherein the touch scan further comprises terminating the touch scan in response to the set of selected columns of nodes having all been sequentially excited.

4. The foreign matter detection method according to claim 1, wherein the second time is prior to the first time.

5. The foreign matter detection method according to claim 1,
wherein the touch scan further comprises:
exciting, at a time subsequent to the first time, the second column of nodes of the node array with the plurality of excitation pulses and simultaneously exciting the first column of nodes and the third column of nodes of the node array with the plurality of dummy pulses; and
wherein the foreign matter scan comprises:
exciting, at a time subsequent to the second time, the second column of nodes of the node array with the plurality of excitation pulses and simultaneously exciting the first column of nodes and the third column of nodes of the node array with the plurality of dummy pulses.

6. The foreign matter detection method according to claim 1, wherein the categorizing the node state is performed at a time subsequent to the first and second times.

7. The foreign matter detection method according to claim 1, wherein the categorizing the node state comprises:
retrieving, by a data storage and retrieval engine, the foreign matter detection data for processing by a node status assignment engine;
retrieving, by the data storage and retrieval engine, the touch detection data for processing by the node status assignment engine; and
assigning, by the node status assignment engine, the state to each node based on a node status truth table in response to the foreign matter detection data and the touch detection data.

8. The foreign matter detection method according to claim 7, wherein the node status truth table comprises at least four states comprising:
an indication that a wanted touch is present at the node and an indication that a foreign matter is present at the node;
the indication that the wanted touch is present at the node and an indication that no foreign matter is present at the node;

an indication that no wanted touch is present at the node and the indication that the foreign matter is present at the node; and
the indication that no wanted touch is present at the node and the indication that no foreign matter is present at the node.

9. A foreign matter scan, comprising:
addressing a first column of nodes;
exciting, at a first time, only the first column of nodes;
grounding, at the first time, every column of nodes adjacent to the first column of nodes;
monitoring, in a self-capacitance mode, a change in self-capacitance on at least one node of the first column of nodes only in order to detect a presence of foreign matter;
exciting, at a second time, only the second column of nodes, and simultaneously grounding every column of nodes adjacent to the second column of nodes, including the first column of nodes and a third column of nodes;
monitoring, in the self-capacitance mode, a change in self-capacitance on at least one node of the second column of nodes only;
exciting, at a third time, only the third column of nodes, and simultaneously grounding every column of nodes adjacent to the third column of nodes, including the first column of nodes and the second column of nodes; and
monitoring, in the self-capacitance mode, a change in self-capacitance on at least one node of the third column of nodes only.

10. A self-capacitance foreign matter detection method, comprising:
exciting, by a node excitation engine, a first node of a node array corresponding to an index, with an excitation pulse;
simultaneously with the exciting, further exciting by the node excitation engine, a second node adjacent to the first node;
monitoring, by a touch detection engine, a change in self-capacitance on the first node;
incrementing the index to address the second node;
exciting, by the node excitation engine, the second node corresponding to the index, with the excitation pulse;
simultaneously with the exciting, further exciting by the node excitation engine, a third node adjacent to the second node;
monitoring, by the touch detection engine, a change in self-capacitance on the second node;
incrementing the index to address the third node;
exciting, by the node excitation engine, the third node corresponding to the index with the excitation pulse;
simultaneously with the exciting, further exciting by the node excitation engine, the first node and the second node;
monitoring, by the touch detection engine, a change in self-capacitance on the third node;
determining, by a scan controller, that each node of the node array has been excited;
storing, by a data storage and retrieval engine, touch detection data corresponding to the change in self-capacitance on the first node, the change in self-capacitance on the second node, and the change in self-capacitance on the third node;
resetting the index to correspond to the first node of the node array;

exciting, by the node excitation engine, the first node of
the node array corresponding to the index, with the
excitation pulse;
simultaneously with the exciting, isolating, by the node
excitation engine, the second node adjacent to the first
node;
monitoring, by the touch detection engine, a further
change in self-capacitance on the first node;
incrementing the index to address the second node;
exciting, by the node excitation engine, the second node
corresponding to the index, with the excitation pulse;
simultaneously with the exciting, isolating, by the node
excitation engine, the third node adjacent to the second
node;
monitoring, by the touch detection engine, a further
change in self-capacitance on the second node;
incrementing the index to address the third node;
exciting, by the node excitation engine, the third node
corresponding to the index with the excitation pulse;
simultaneously with the exciting, isolating by the node
excitation engine the first node and the second node;
monitoring, by the touch detection engine, a further
change in self-capacitance on the third node;
determining, by the scan controller, that each node of the
node array has been excited; and
storing, by the data storage and retrieval engine, foreign
matter detection data corresponding to the further
change in self-capacitance on the first node, the further
change in self-capacitance on the second node, and the
further change in self-capacitance on the third node.

11. The foreign matter detection method according to claim 10,
wherein each node belongs to a different column of nodes, and
wherein the node array belongs to a capacitive touch screen.

12. The foreign matter detection method according to claim 10, wherein isolating comprises one of grounding or clamping to a DC voltage.

13. The foreign matter detection method according to claim 10, further comprising performing a node state categorization method comprising assigning a node state to each node in response to the touch detection data and the foreign matter detection data.

14. The foreign matter detection method according to claim 13,
wherein the state categorization method comprises:
retrieving, by the data storage and retrieval engine, the foreign matter detection data for processing by a node status assignment engine;
retrieving, by the data storage and retrieval engine, the touch detection data for processing by the node status assignment engine; and
assigning, by the node status assignment engine, a node status to each node based on a node status truth table,
wherein the node status truth table comprises at least four states comprising:
an indication that the wanted touch is present at the node and an indication that a foreign matter is present at the node;
the indication that the wanted touch is present at the node and an indication that no foreign matter is present at the node;
an indication that no wanted touch is present at the node and the indication that the foreign matter is present at the node; and
the indication that no wanted touch is present at the node and the indication that no foreign matter is present at the node.

15. A foreign matter detection method, comprising:
first exciting, by a node excitation engine, a first node of a node array, with an excitation pulse;
simultaneously with the exciting, further exciting by the node excitation engine, a second node adjacent to the first node;
monitoring, by a touch detection engine, a first change in self-capacitance on the first node;
storing, by a data storage and retrieval engine, touch detection data corresponding to the change in self-capacitance on the first node;
second exciting, by the node excitation engine, the first node of the node array, with the excitation pulse;
simultaneously with the second exciting, isolating, by the node excitation engine, the second node adjacent to the first node;
monitoring, by the touch detection engine, a second change in self-capacitance on the first node;
storing, by the data storage and retrieval engine, foreign matter detection data corresponding to the second change in self-capacitance on the first node; and
determining a foreign matter state of the first node from a combination of the touch detection data and the foreign matter detection data for the first node.

16. The foreign matter detection method according to claim 15,
wherein each node belongs to a different column of nodes, and
wherein the node array belongs to a capacitive touch screen.

17. The foreign matter detection method according to claim 15, wherein isolating comprises one of grounding or clamping to a DC voltage.

18. The foreign matter detection method according to claim 15, further comprising performing a node state categorization by assigning a node state to each node in response to the touch detection data and the foreign matter detection data.

19. The foreign matter detection method according to claim 18,
wherein assigning the node state comprises:
retrieving, by the data storage and retrieval engine, the foreign matter detection data for processing by a node status assignment engine;
retrieving, by the data storage and retrieval engine, the touch detection data for processing by the node status assignment engine; and
assigning, by the node status assignment engine, a node status to each node based on a node status truth table,
wherein the node status truth table comprises at least four states comprising:
an indication that the wanted touch is present at the node and an indication that a foreign matter is present at the node;
the indication that the wanted touch is present at the node and an indication that no foreign matter is present at the node;
an indication that no wanted touch is present at the node and the indication that the foreign matter is present at the node; and
the indication that no wanted touch is present at the node and the indication that no foreign matter is present at the node.

20. The foreign matter detection method according to claim 15, wherein second exciting is performed before first exciting.

21. A foreign matter detection method, comprising:
performing a touch scan comprising:
exciting a target column of nodes of a node array and one or more immediately adjacent neighbor columns of nodes of the node array; and
measuring a change in self-capacitance of the nodes of the target column to generate touch detection data;
performing a foreign matter scan comprising:
exciting the target column of nodes of the node array and grounding the one or more immediately adjacent neighbor columns of nodes of the node array; and
measuring a change in self-capacitance of the nodes of the target column to generate foreign matter detection data; and
categorizing a node state comprising assigning a node state to each node of the target column in response to a combination of the touch detection data and the foreign matter detection data in order to distinguish between a presence of foreign matter at the target column and a touch at the target column.

22. The self-capacitance foreign matter detection method according to claim 21, wherein the foreign matter scan further comprises:
addressing as a second target column, a first immediately adjacent neighbor column of nodes of the node array selected from the one or more immediately adjacent neighbor columns;
exciting the second target column of nodes of the node array and grounding the target column of nodes of the node array; and
measuring a change in self-capacitance of the nodes of the second target column to generate second foreign matter detection data.

23. The self-capacitance foreign matter detection method according to claim 22, wherein categorizing the node state further comprises assigning the node state to each node of the second target column in response to a combination of the touch detection data and the second foreign matter detection data in order to distinguish between the presence of foreign matter at the second target column and the touch at the target column.

24. The self-capacitance foreign matter detection method according to claim 21,
wherein the touch scan further comprises:
addressing as a second target column, a first immediately adjacent neighbor column of nodes of the node array selected from the one or more immediately adjacent neighbor columns;
exciting the second target column, the target column, and a further immediately adjacent neighbor column of nodes of the node array adjacent the second target column; and
measuring a change in self-capacitance of the nodes of the second target column to generate second touch data;
wherein the foreign matter scan further comprises:
exciting the second target column of nodes of the node array and grounding the target column and the further immediately adjacent neighbor column; and
measuring a change in self-capacitance of the nodes of the second target column to generate second foreign matter detection data; and
wherein categorizing the node state further comprises assigning the node state to each node of the second target column in response to the combination of the second touch data and the second foreign matter detection data in order to distinguish between the presence of foreign matter at the second target column and the touch at the second target column.

25. The self-capacitance foreign matter detection method according to claim 21, the node state selected from a node state truth table comprising at least four states comprising:
an indication that the touch is present at the node and an indication that the foreign matter is present at the node in response to both the touch data and the foreign matter detection data indicating a presence;
the indication that the touch is present at the node and an indication that no foreign matter is present at the node in response to the touch data indicating a presence and the foreign matter detection data indicating no presence;
an indication that no touch is present at the node and the indication that the foreign matter is present at the node in response to the touch data indicating no presence and the foreign matter detection data indicating the presence; and
the indication that no touch is present at the node and the indication that no foreign matter is present at the node in response to the touch data indicating no presence and the foreign matter detection data indicating no presence.

* * * * *